(12) United States Patent
Kawamura et al.

(10) Patent No.: US 10,132,358 B2
(45) Date of Patent: Nov. 20, 2018

(54) ROLLING BEARING

(71) Applicant: NTN CORPORATION, Osaka (JP)

(72) Inventors: Mitsuo Kawamura, Mie (JP); Tomohiko Obata, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/127,762

(22) PCT Filed: Mar. 20, 2015

(86) PCT No.: PCT/JP2015/058428
§ 371 (c)(1),
(2) Date: Sep. 20, 2016

(87) PCT Pub. No.: WO2015/141822
PCT Pub. Date: Sep. 24, 2015

(65) Prior Publication Data
US 2017/0152891 A1    Jun. 1, 2017

(30) Foreign Application Priority Data

Mar. 20, 2014  (JP) .................................. 2014-058870
Mar. 20, 2014  (JP) .................................. 2014-058894

(51) Int. Cl.
*F16C 41/00* (2006.01)
*F16C 33/78* (2006.01)
(Continued)

(52) U.S. Cl.
CPC ............ *F16C 41/002* (2013.01); *F16C 19/06* (2013.01); *F16C 33/445* (2013.01);
(Continued)

(58) Field of Classification Search
CPC .............. F16C 33/3806; F16C 33/4605; F16C 33/6607; F16C 33/6633; F16C 33/664;
(Continued)

(56) References Cited

U.S. PATENT DOCUMENTS 3,820,864 A * 6/1974 Petre ...................... F16C 19/30
                                                            384/573
4,597,582 A   7/1986 Muller
(Continued)

FOREIGN PATENT DOCUMENTS

CN        1750363 A      3/2006
CN      102844579 A     12/2012
(Continued)

OTHER PUBLICATIONS

International Search Report for PCT/JP2015/058428 dated Jun. 23, 2015.
(Continued)

*Primary Examiner* — James Pilkington
(74) *Attorney, Agent, or Firm* — Hedman & Costigan, P.C.; James V. Costigan; Kathleen A. Costigan

(57) ABSTRACT

A rolling bearing that can easily achieve the higher lubricating characteristic including the smaller rotational torque while employing the existing bearing shape and lubricant is provided. A rolling bearing 1 includes: an inner ring 2 and an outer ring 3 as a race ring; a plurality of rolling elements 4 held between the inner and outer rings; a retainer 5 that retains the rolling elements 4; a sealing member 11 provided at openings on opposite ends in an axial direction of the inner ring 2 and the outer ring 3; and grease 12 to be enclosed in an in-bearing space. At least one member selected from the inner ring 2, the outer ring 3, the retainer 5, and the sealing member 11 is provided with a flocking part 6 formed by flocking fiber on a surface of the member which is in contact with the grease 12.

1 Claim, 10 Drawing Sheets

(51) Int. Cl.
  *F16C 19/06* (2006.01)
  *F16C 33/66* (2006.01)
  *F16C 33/44* (2006.01)
  *F16C 33/41* (2006.01)
(52) U.S. Cl.
  CPC ...... *F16C 33/6633* (2013.01); *F16C 33/7816* (2013.01); *F16C 33/7853* (2013.01); *F16C 33/416* (2013.01); *F16C 33/6637* (2013.01); *H05K 999/99* (2013.01)
(58) Field of Classification Search
  CPC . F16C 33/7816; F16C 33/7853; F16C 41/002
  See application file for complete search history.

(56) References Cited

U.S. PATENT DOCUMENTS

| | | | |
|---|---|---|---|
| 8,545,105 | B2* | 10/2013 | Kawamura ........... F16C 33/416 384/470 |
| 9,175,728 | B2* | 11/2015 | White ................. F16C 33/7843 |
| 2011/0317953 | A1 | 12/2011 | Moratz |

FOREIGN PATENT DOCUMENTS

| | | |
|---|---|---|
| GB | 1427095 A | 3/1976 |
| GB | 1429277 A | 3/1976 |
| GB | 2100827 A | 1/1983 |
| JP | 55-040306 A | 3/1980 |
| JP | 61-175200 A | 8/1986 |
| JP | 11-166540 A | 6/1999 |
| JP | 2000-266067 A | 9/2000 |
| JP | 2002-089579 A | 3/2002 |
| JP | 3330755 B2 | 9/2002 |
| JP | 2005-114119 A | 4/2005 |
| JP | 2006-009988 A | 1/2006 |
| JP | 2006-161897 A | 6/2006 |
| JP | 2007-100006 A | 4/2007 |
| JP | 2007-113744 A | 5/2007 |
| JP | 2007-292195 A | 11/2007 |
| JP | 5045806 B2 | 10/2012 |
| WO | 2009/056098 A1 | 5/2009 |

OTHER PUBLICATIONS

English Abstract for JP 2006-161897 A dated Jun. 22, 2006.
English Abstract for JP 2005-114119 A dated Apr. 28, 2005.
English Abstract for JP 2002-089579 A dated Mar. 27, 2002.
Supplementary European Search Report dated Feb. 5, 2018.
English Abstract for CN 102844579 A dated Dec. 26, 2012.
English Abstract for CN 1750363 A dated Mar. 22, 2006.

* cited by examiner (a)

(b)

(a)

(b)

(a)

(b)

ROLLING BEARING

TECHNICAL FIELD

The present invention relates to a rolling bearing which is lubricated with lubricating oil or grease.

BACKGROUND ART

A rolling bearing generally includes an inner ring, an outer ring, a rolling element, and a retainer. An open end thereof may be provided with a sealing member in order to prevent the intrusion of foreign substances from the outside or the leakage of the lubricant enclosed inside. The lubrication inside the bearing is carried out by the lubricant such as oil or grease, and various devises have been made in order to improve the lubricating characteristic of the bearing.

For example, Patent Document 1 has suggested the technique of improving the lubricating characteristic by forming a lubricating film on a retainer. Patent Document 1 describes a rolling device whose outer member, inner member, rolling element, and the like have their surface provided with a predetermined lubricating film. The lubricating film is formed of a solid lubricant through a shot peening process and is used for preventing the smearing, burning, abrasion, and peeling under the high speed and large load (see Patent Document 1). Moreover, Patent Document 2 has suggested the technique of improving the lubricating characteristic by changing the lubricant, the lubricating condition, and the like. Patent Document 2 describes the grease composition used for a bearing, which contains predetermined ester oil and diurea compound in a predetermined mixing amount. This can achieve the excellent resistance against the separation and the grease leakage, and suppress the early burning even in the use for the bearing of the outer ring rotation (see Patent Document 2).

Another technique of improving the lubricating characteristic by changing the shape of the retainer is disclosed in Patent Document 3. Patent Document 3 describes a deep groove ball bearing including a retainer, which includes two annular holding plates formed by pressing a steel plate and which is provided with a polygonal pocket part. This can reduce the rotational torque of the bearing (see Patent Document 3).

Moreover, copiers and printers often employ a rolling bearing for rotatably supporting the rotatable components such as a sheet feeding roller, a photosensitive drum, and a fixing roller. It has been known that if the bearing is charged, the photosensitive part to which the toner is attached is adversely influenced and the image quality will be deteriorated. The grounding mechanism has been typically used to prevent the charging but considering that the grounding mechanism is complicated and the smaller space for the device main body is desired, it is desirable that the rolling bearing has the function of preventing the charging.

Typically, Patent Documents 4 to 6 have suggested the rolling bearing that enables the electric conduction between the inner and outer rings in the bearing for preventing the charging. Patent Document 4 describes the rolling bearing that enables the conduction between the inner and outer rings by attaching a conductive thin wire to a steel plate shield of the bearing and bringing the thin wire in contact with the inner ring groove. This bearing allows the electric conduction for a long time regardless of the number of rotations and prevents the noise, and Patent Document 4 suggests a plurality of modes in regard to how the thin wire is attached and what kind of shape the sealing member has.

Patent Document 5 describes the bearing including the contact type sealing member, and since the sealing member has the conductivity, the electric conduction between the inner and outer rings is possible.

Patent Document 6 describes the rolling bearing having the conductive grease enclosed in the bearing. This bearing employs the conductive material such as carbon black as the thickener of the grease, thereby allowing the electric conduction between the inner and outer rings through the conductive grease during the rotation.

PRIOR ART DOCUMENTS

Patent Documents

Patent Document 1: Japanese Patent No. 5045806
Patent Document 2: Japanese Patent No. 3330755
Patent Document 3: JP-A-2007-292195
Patent Document 4: JP-A-2000-266067
Patent Document 5: JP-A-2007-113744
Patent Document 6: JP-A-2007-100006

SUMMARY OF THE INVENTION

Problems to be Solved by the Invention

However, in the rolling device according to Patent Document 1, the lubricating film is formed on the surface of the member included in the device which is in rolling contact (the race ring surface of the race ring or the rolling surface of the rolling element itself), so that it is necessary to form the film with high accuracy and the manufacturing cost is high. Patent Document 2 is to improve the lubricating characteristic by improving the grease to be enclosed; in the case of using the semi-solid lubricant such as grease, the rotational torque is increased because of the resistance to agitation due to the lubricant. For saving the energy of the rolling bearing used for the recent automobiles or industrial appliances, it is important to reduce the rotational torque while securing the sufficient lubricating lifetime.

In regard to this problem, the rotational torque can be reduced by using a retainer with a special shape as disclosed in Patent Document 3. Further, the rotational torque can be reduced by optimizing the kind of grease or reducing the amount of grease to be enclosed. However, these result in the higher manufacturing cost or shorter lifetime of the bearing. Thus, it has been desired to develop the technique of improving the lubricating characteristic (particularly, reducing the rotational torque) without making the shape of the bearing, the kind of grease, the amount of grease to be enclosed, and the like largely different from those of the existing product.

The rolling bearings according to Patent Documents 4 to 6 are bearings having the grease enclosed therein. In this case, as described above, the resistance to agitation of the grease easily causes the rotational torque to increase. The recent copiers and printers are desired to have smaller size (size reduction) or consume less energy, and for this reason, the rolling bearing has been desired to have the smaller rotational torque in addition to having the function of preventing the charging.

In the case of providing the steel plate shield with the conductive thin wire as disclosed in Patent Document 4 and in the case of using the conductive contact type sealing member as disclosed in Patent Document 5, the relative speed difference between the outer ring and the inner ring is large. Thus, the conductor (contact portion) is easily worn out and the contact easily fails. If the grease is leaked out from the inside of the bearing having the conductive thin wire attached to the shield and the thin wire is smeared with the grease, an oil film may be formed and the bearing may therefore fail the conduction. If the contact type sealing member has the conductivity, applying the conductive lubricant to the lip surface for preventing the defective conduction caused by the oil film may increase the rotational torque due to the agitation of the extra lubricant.

In the case where the electric conduction of the bearing in the normal mode is secured by only the conductive grease to be enclosed, the electric conduction between the inner and outer rings of the bearing may be failed if the grease has deteriorated over time or the conductive material on the rolling surface is eliminated along with the rotation. This is because, for example, the conductive material including carbon is broken on the contact surface between the rolling element and the inner and outer rings of the bearing where the electricity conducts, so that the conductive material does not remain on the contact surface.

The present invention has been made in view of the above, and an object is to provide a rolling bearing that can achieve the improvement of the lubricating characteristic including the reduction of the rotational torque by simple means. Another object is to provide a rolling bearing that can secure the electric conduction while reducing the rotational torque.

Means for Solving the Problem

An aspect of the rolling bearing according to the present invention is a rolling bearing including: an inner ring and an outer ring as a race ring; a plurality of rolling elements held between the inner and outer rings; a retainer that retains the rolling elements; a sealing member provided at openings on opposite ends in an axial direction of the inner ring and the outer ring; and a lubricant including grease or lubricating oil to be enclosed in an in-bearing space. At least one member selected from the inner ring, the outer ring, the retainer, and the sealing member is provided with a flocking part formed by flocking fiber on a surface of the member which is in contact with the lubricant except the surface in contact with the rolling element. Note that the place (surface) where the flocking part is formed may be the place other than the surface in contact with the rolling element and the end of the flocked fiber formed thereon may be in contact with the rolling element.

Another aspect of the rolling bearing according to the present invention is a rolling bearing including: an inner ring and an outer ring as a race ring; a plurality of rolling elements held between the inner and outer rings; a retainer that retains the rolling elements; and a lubricant including grease or lubricating oil to be supplied to an in-bearing space. At least one member selected from the inner ring, the outer ring, and the retainer is provided with a flocking part formed by flocking fiber on a surface of the member which is in contact with the lubricant except the surface in contact with the rolling element. Note that "supplying to the in-bearing space" includes supplying the lubricating oil or the like from the outside of the bearing or supplying the lubricating oil or the like to the inside of the bearing in advance and retaining the oil therein.

The flocking part is formed on an inner diameter surface and/or an outer diameter surface of the retainer.

In the retainer, a pocket part that retains the rolling element is provided with a recess which is not in contact with the rolling element, and the flocking part is formed on a surface of the recess.

The fiber is synthetic resin fiber and the flocking part is formed by electrostatic flocking.

The inner ring is electrically conducted with the outer ring through at least (1) conductive grease and/or (2) a conductive flocking part as the flocking part, as a conductive passage, (1) conductive grease being supplied or enclosed as the lubricant, (2) the conductive flocking part as the flocking part using conductive fiber as the fiver. The term "conduction" refers to the electric conduction unless otherwise stated.

The inner ring is electrically conducted with the outer ring further through the retainer and/or the rolling element as a conductive passage. In one embodiment, the rolling element serves as the conductive passage, and the flocking part is formed in a shoulder adjacent to a race ring surface of the race ring and has a fiber end in contact with the rolling element. In another embodiment, the retainer serves as the conductive passage and the inner ring and the outer ring are in contact with the retainer through the flocking part.

Effect of the Invention

A rolling bearing according to the present invention includes: an inner ring and an outer ring as a race ring; a plurality of rolling elements held between the inner and outer rings; a retainer that retains the rolling elements; a sealing member provided at openings on opposite ends in an axial direction of the inner ring and the outer ring; and a lubricant including grease or lubricating oil to be enclosed in an in-bearing space. At least one member selected from the inner ring, the outer ring, the retainer, and the sealing member is provided with a flocking part formed by flocking fiber on a surface of the member which is in contact with the lubricant except the surface in contact with the rolling element. Since the flocking part where the fiber is transplanted is formed, the grease or the lubricating oil is retained in the flocking part. Thus, the lubricating characteristic can be improved while the existing bearing shape and lubricant are used. Specifically, in the case of the grease lubricating, the agitation and shearing of the grease can be suppressed, and the smaller torque and longer life can be achieved. In addition, the movement of the grease itself in the bearing can be suppressed and the leakage of the grease can be reduced. In the case of the oil lubricating, the torque can be smaller than in the case of the grease lubricating. If necessary, the oil supply from the outside can be omitted and this can make the bearing device smaller.

The flocking part is formed on the inner diameter surface and/or the outer diameter surface of the retainer. Thus, the lubricant such as the grease is fixed to the flocking part and is not sheared. The lubricant rotates with the retainer and the resistance to agitation is not generated. As a result, the rotational torque can be drastically reduced without reducing the amount of lubricant to be enclosed.

The pocket part of the retainer that retains the rolling element is provided with the recess which is not in contact with the rolling element, and the flocking part is formed on the surface of the recess. This provides the effect of retaining the grease or the lubricating oil without collapsing the shape of the pocket part and without deteriorating the bearing function.

The fiber of the flocking part is the synthetic resin fiber, and the flocking part is formed through the electrostatic flocking. Thus, the swelling or dissolving, for example, due to the oil uneasily occurs and such flocking part is therefore chemically stable, uniform, and dense.

The inner ring is electrically conducted with the outer ring through at least (1) conductive grease and/or (2) a conductive flocking part as the flocking part, as a conductive passage, (1) conductive grease being supplied or enclosed as the lubricant, (2) the conductive flocking part as the flocking part using conductive fiber as the fiver. Thus, the lubricant is retained in the flocking part while the conduction is secured, and the smaller torque and longer life can be achieved.

The inner ring is electrically conducted with the outer ring further through the retainer and/or the rolling element as a conductive passage. Therefore, for example, if the conductive passage is the inner ring—the flocking part—the rolling element—the flocking part—the outer ring, or the inner ring—the flocking part—the retainer—the flocking part—the outer ring, in the place where the flocking part is in contact with the rolling element and the place where the flocking part is in contact with the retainer, the relative speed difference of the contact members becomes smaller than the relative speed difference between the inner ring and the outer ring. Therefore, the abrasion of the flocked fiber can be suppressed and the conduction can be secured for a long time.

MODE FOR CARRYING OUT THE INVENTION

Figure 1:
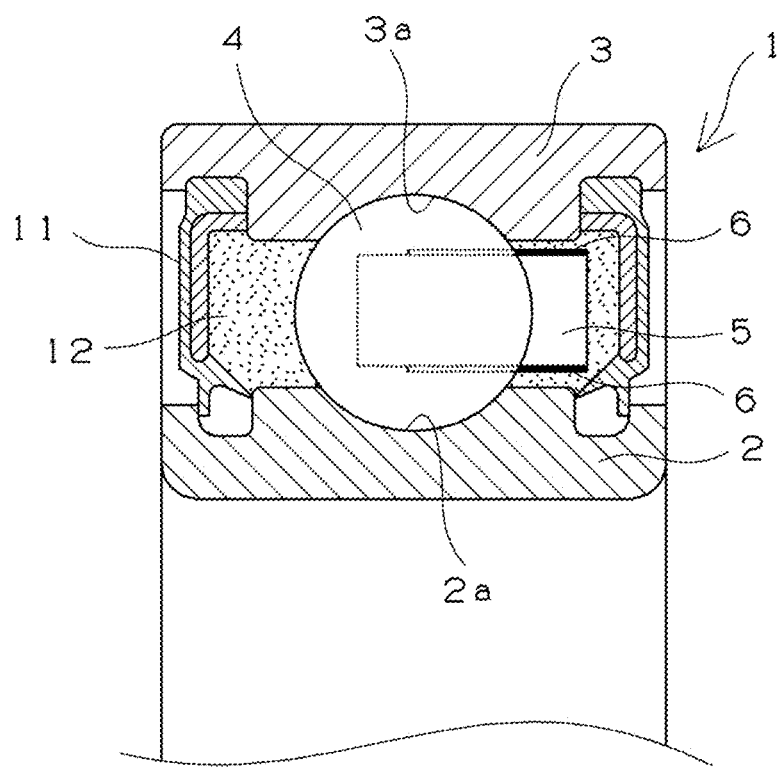
FIG. 1 is a sectional view illustrating a part of a rolling bearing according to one example of the present invention.
Figure 2:
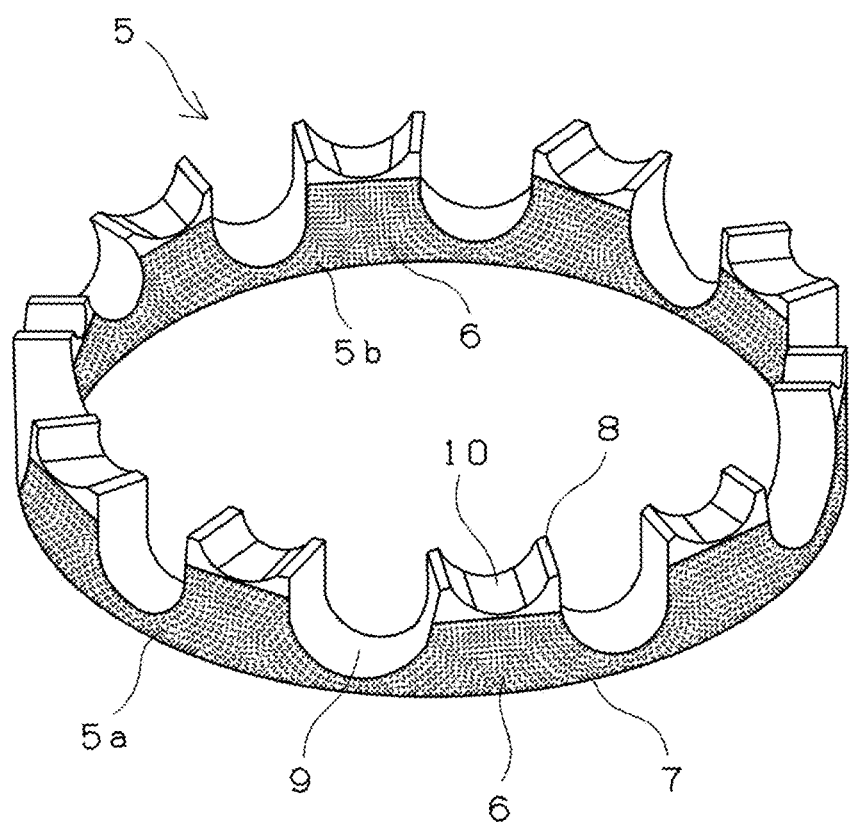
FIG. 2 is a perspective view of a retainer in FIG. 1.

An example of a rolling bearing according to the present invention is described with reference to FIGS. 1 and 2. FIG. 1 is a sectional view illustrating a part of a deep groove ball bearing incorporating a resin crown retainer having a flocking part as the rolling bearing according to the present invention. FIG. 2 is a perspective view of this crown retainer. As illustrated in FIG. 1, a rolling bearing 1 includes an inner ring 2 having a rolling surface 2a on its outer peripheral surface, and an outer ring 3 having a rolling surface 3a on its inner peripheral surface, the inner and outer rings sharing the same center. A plurality of rolling elements 4 is disposed between the rolling surface 2a of the inner ring and the rolling surface 3a of the outer ring. The plurality of rolling elements 4 is retained by a crown-shaped retainer 5.

The rolling bearing 1 includes an annular sealing member 11 provided at an opening on opposite ends in the axial direction of the inner and outer rings, and is lubricated by grease 12 enclosed in an in-bearing space formed by the inner ring 2, the outer ring 3, the retainer 5, and the sealing member 11. In this embodiment, a flocking part 6 where fiber is flocked is formed on the surface of the retainer 5 that is in contact with the grease 12 (surface on the in-bearing space side).

As illustrated in FIG. 2, the crown-shaped retainer 5 has pairs of opposite retention nails 8 at constant pitches in the circumferential direction on an upper surface of an annular main body 7. The opposite retention nails 8 are curved in a direction of approaching each other and a pocket part 9 for retaining the ball as the rolling element is formed between the retention nails 8. Between the back surfaces of the adjacent retention nails 8 formed at the edge of the adjacent pocket parts 9, a flat part 10 is formed to serve as the reference plane based on which the retention nail 8 rises. In this embodiment, the flocking part 6 is formed in an outer diameter surface 5a (outer ring side surface) and an inner diameter surface 5b (inner ring side surface) of the main body 7. The inner diameter surface 5b and the outer diameter surface 5a of the retainer 5 are not in contact with the ball as the rolling element. The flocking part of the retainer may be formed over the entire surface other than the surface in contact with the ball. The inner diameter surface 5b and the outer diameter surface 5a of the retainer 5 are not the surface located outside the bearing but the surface on the in-bearing space side formed by the inner ring, the outer ring, the retainer, and the sealing member, and the surface in contact with the enclosed grease. In addition, since the retainer 5 in this embodiment is a guide of the rolling element, the inner diameter surface 5b and the outer diameter surface 5a are not in contact with the race ring (inner ring 2 and outer ring 3 in FIG. 1). A surface of the retainer that guides the race ring, which is in contact with the race ring, such as a guide surface may be provided with the flocking part.

When the grease is fixed and retained by the flocking part and rotates together with the retainer without being sheared, the resistance to agitation is not generated and the rotational torque is reduced as compared to the case in which the flocking part is not provided. The grease, if sheared, will become softer to be easily separated from oil and in this case the lubricating lifetime becomes shorter. In the present invention, however, the grease is retained by the flocking part and therefore uneasily sheared; thus, the lubricating lifetime can be extended. In the case of the oil lubricating, having the flocking part absorb the lubricating oil enables to retain a sufficient amount of lubricating oil in the bearing and it is not necessary to supply oil from the outside. Moreover, in this case, the semi-solid substance that interrupts the rotation, such as the grease lubricating, does not exist, so that the torque is decreased.

The flocking part is formed by flocking the short fiber. A method of transplanting the fiber may be spraying or electrostatic flocking. The electrostatic flocking is preferable because a large amount of fiber can be transplanted vertically and densely in a short time on the curved surfaces including the inner and outer diameter surfaces and the race ring shoulder of the retainer. The electrostatic flocking method may be a known method. For example, an adhesive is applied in the range where the electrostatic flocking is intended, the short fiber is charged and transplanted substantially vertically with the electrostatic force on the surface where the adhesive is applied, and then a drying process and a finishing process are performed.

The short fiber used in the flocking is not particularly limited and may be any short fiber usable for the flocking. Examples thereof include (1) polyolefin resin such as polyethylene and polypropylene, polyamide resin such as nylon, aromatic polyamide resin, polyester resin such as polyethylene terephthalate, polyethylene naphthalate, polyethylene succinate, and polybutylene terephthalate, synthetic resin fiber such as acrylic resin, vinyl chloride, and vinylon, (2) inorganic fiber such as carbon fiber and glass fiber, and (3) recycled fiber such as rayon and acetate, and natural fiber such as cotton, silk, hemp, and wool. These may be used alone or two or more kinds thereof may be used in combination. The synthetic resin fiber in the above described fibers is particularly preferably because such resin uneasily swells or dissolves in oil and is chemically stable, a large amount of uniform fiber can be produced, and the cost is low.

The shape of the short fiber is not particularly limited and any shape that does not interfere with another member and that does not adversely affect the bearing function in the flocking area may be used. Specifically, for example, the fiber with a length of 0.5 to 2.0 mm and a thickness of 0.5 to 50 dtex is preferable. In regard to the density of the short fiber in the flocking part, the ratio of the fiber in the flocking area is preferably 10 to 30%. The shape of the short fiber may be the straight shape or the bent shape (an end is bent), and the sectional shape may be the circular shape or the polygonal shape. The bent shape can retain the grease more firmly than the straight shape. Using the short fiber with the polygonal cross section can provide the larger surface area than using the short fiber with the circular cross section, and thus the surface tension can be made larger. The shape of the short fiber is preferably selected in accordance with the characteristic.

The adhesive may be an adhesive mainly containing urethane resin, epoxy resin, acrylic resin, vinyl acetate resin, polyimide resin, silicone resin, or the like. For example, an urethane resin solvent adhesive, an epoxy resin solvent adhesive, an vinyl acetate resin solvent adhesive, an acrylic resin emulsion adhesive, an acrylic acid ester-vinyl acetate copolymer emulsion adhesive, a vinyl acetate emulsion adhesive, an urethane resin emulsion adhesive, an epoxy resin emulsion adhesive, a polyester emulsion adhesive, an ethylene-vinyl acetate copolymer adhesive, or the like is given. These may be used alone or two or more kinds thereof may be used in combination.

In the retainer 5, the fiber may be flocked in only the inner diameter surface, only the outer diameter surface, or any other place, without being limited to the embodiment illustrated in FIG. 2. It is desirable that the adhesive for flocking the fiber is not attached in the area of the retainer 5 which is in contact with the rolling element. The retainer 5 and the rolling element may be in contact with each other in the pocket part 9 of the retainer 5. For example, if the adhesive is attached to the pocket part 9, the shape of the pocket part 9 collapses and the binding of the rolling element or the contact between the rolling element and the adhesive may result in the damage of the rolling element. On the other hand, if just the end of the flocked fiber is brought into contact with the rolling element, the lubricant on the surface of the rolling element is scraped so that the amount of lubricant on the rolling element can be reduced, which is preferable. Causes of the resistance to rotation of the bearing include the resistance to agitation of the lubricant and an influence from the thickness of the lubricating oil film. The rotational torque of the bearing is reduced by minimizing the amount of oil contributing to the lubrication.

Figure 3:
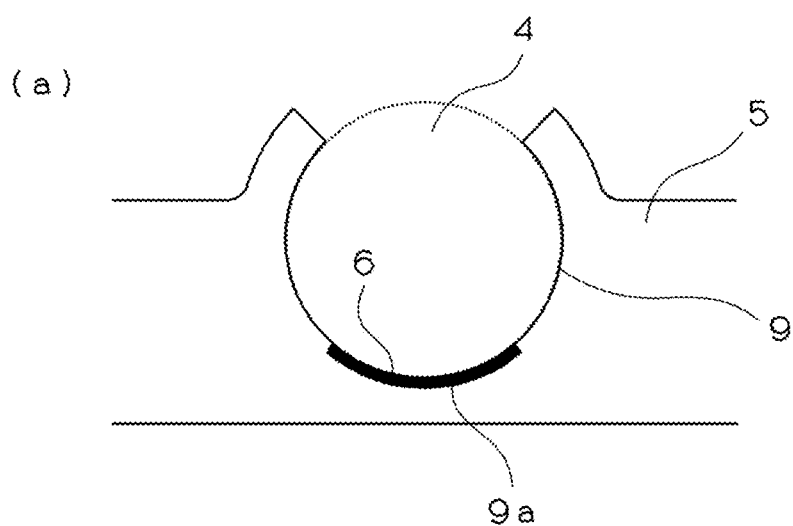
FIG. 3 are diagrams illustrating other modes of the retainer.
Figure 3:
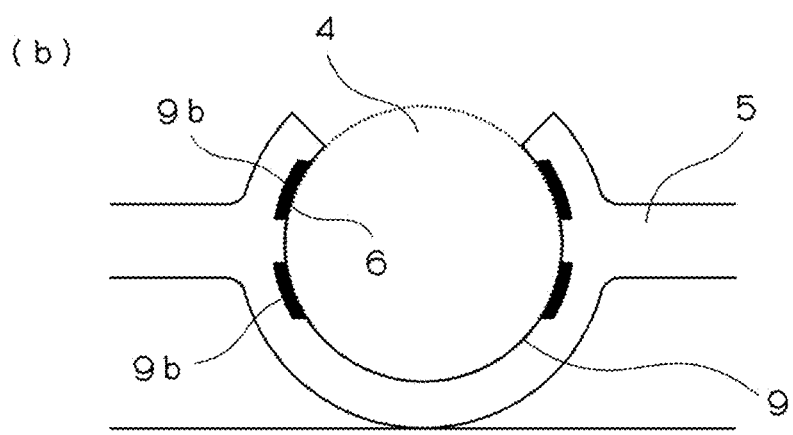

When the fiber is flocked in the area other than the place of the retainer that is in contact with the rolling element, the effect of retaining grease or lubricating oil can be obtained without losing the bearing function. FIG. 3 are schematic diagrams illustrating other embodiments of the flocking part. In FIGS. 3(a) and (b), the pocket part 9 of the retainer 5 for retaining the rolling element 4 is provided with recesses 9a and 9b which are not in contact with the rolling element 4. The flocking part 6 is formed on the surface of the recess (bottom of the recess). Flocking the fiber in such a recess enables the contact only between the flocked fiber and the rolling element without changing the binding of the rolling element. The recesses may communicate in the retainer radial direction. The number of recesses and the shape thereof are not limited in particular and the depth of the recess is preferably larger than the thickness of the applied adhesive in the flocking.

Although FIGS. 2 and 3 illustrate the crown retainer, the rolling bearing according to the present invention may have the flocking part in the retainer such as the corrugated retainer or the machined retainer. The material of the retainer may be any material such as the metal material or the resin material. The kind of adhesive is decided in accordance with the material of the retainer and the material of the short fiber.

The crown retainer illustrated in FIGS. 2 and 3 is made of resin. For example, the crown retainer is manufactured through injection molding using the resin composition containing the resin base, the reinforced fiber such as carbon fiber or glass fiber, and other additives. The resin base may be polyetheretherketone (PEEK) resin, polyphenylene sulfide (PPS) resin, thermoplastic polyimide resin, polyamideimide resin, nylon 66 resin, nylon 46 resin, or other polyamide resin.

It is supposed that the capability of the retainer to retain the lubricant such as grease is increased by making the surface of the retainer rough. The surface roughness of the resin retainer manufactured through the injection molding is, however, often set small in consideration of the process of extraction from the mold. Increasing the surface roughness of the mold in order to increase the surface roughness of the retainer makes it difficult to extract the retainer from the mold and shortens the mold lifetime because of the abrasion. To achieve the surface roughness necessary to retain the lubricant such as grease just by the injection molding is difficult in terms of the cost and the mold lifetime. The resin material such as nylon has the low elasticity so that it is difficult to make the surface of the retainer rough in the later process, which is different from the metal material. The resin material is deburred by shot blasting but this process does not necessarily increase the surface roughness. On the other hand, if the flocking part is provided, the retainer can be formed of resin and at the same time, the surface roughness and the surface area can be easily increased. Thus, the capability of retaining the grease and the lubricant can be increased. In the case of using the metal retainer formed by pressing or cutting, similarly, it is difficult to achieve the surface area as large as the area obtained with the flocking through the surface processing.

The flocking part may be formed on the race ring or the surface of the sealing member, other than the retainer. In any case, the flocking part is formed on the surface in contact with the lubricant other than the contact surface with the rolling element. In one rolling bearing, the flocking part may be formed in each of a plurality of members included in the rolling bearing.

Figure 4:
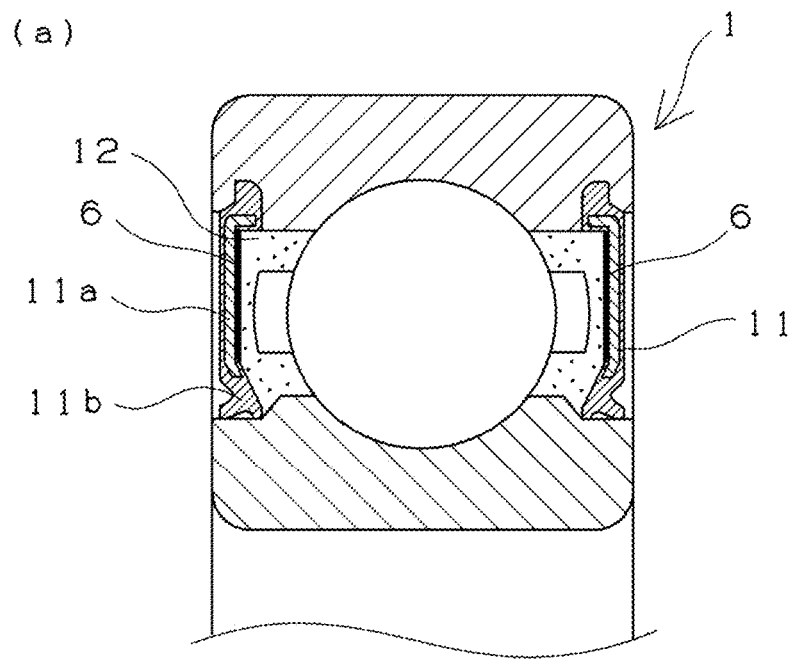
FIG. 4 are sectional views illustrating a part of a rolling bearing according to another example of the present invention.
Figure 4:
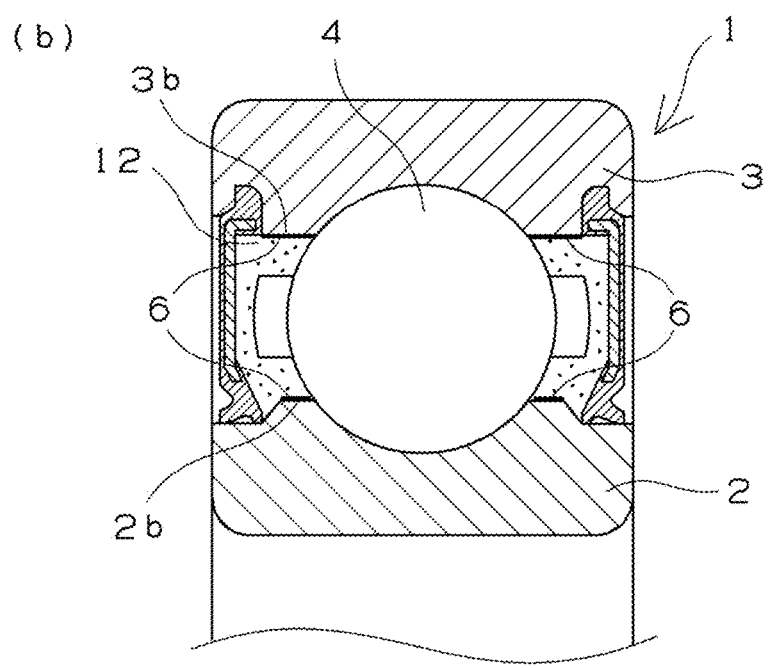

Another example of the rolling bearing according to the present invention will be described with reference to FIG. 4.

FIG. 4(a) is a sectional view illustrating a part of a deep groove ball bearing incorporating a sealing member with a flocking part as a rolling bearing according to the present invention, and FIG. 4(b) is a sectional view illustrating a part of a deep groove ball bearing including a race ring with a flocking part. In the example illustrated in FIG. 4(a), the flocking part 6 is formed on an inner surface of the sealing member 11 of the rolling bearing 1. Specifically, the sealing member 11 includes a metal plate 11a for reinforcement, and a rubber member 11b forming a seal lip. The flocking part 6 is formed on a surface of the metal plate 11a on the in-bearing space side. The flocking part 6 may be formed not just at the place illustrated in the drawing but on any surface of the sealing member 11 in contact with the grease 12. The structure on the sealing member side when the flocking part is formed is not limited in particular, and the sealing member without the metal plate or the sealing member including only the metal plate (shield plate) may be employed.

In the example illustrated in FIG. 4(b), the flocking part 6 is formed in all of or a part of a shoulder 2b of the inner ring 2 or a shoulder 3b of the outer ring 3. The place where the flocking part 6 is formed is not limited to the illustrated place and may be anyplace that is in contact with the grease 12 except the rolling surface of the race ring (inner ring 2 and outer ring 3) in contact with the rolling element 4. Forming the flocking part in the shoulder near the rolling surface enables the oil to go through the flocking part to be supplied to the rolling surface easily. The structures illustrated in FIGS. 4(a) and 4(b) may be used in combination. In the case of the normal rolling bearing without the flocking part, the grease scattered to the sealing surface or the like does not contribute to the lubricating but the oil passage is formed by the flocking part in the bearing and even if the grease has scattered around, the scattered grease can contribute to the lubricating of the bearing.

The rolling bearing according to the present invention is lubricated with the lubricating oil or the grease. The lubricant (lubricating oil or grease) is supplied to and enclosed in the in-bearing space, and lubricates by being held on the rolling surface or the like. Any lubricating oil that is applicable to the normal rolling bearing can be used without particular limitation. For example, mineral oil such as paraffin mineral oil and naphthenic mineral oil, synthetic hydrocarbon oil such as polybutene oil, poly-α-olefin oil, alkyl benzene oil, and alkyl naphthalene oil, or synthetic non-hydrocarbon oil such as natural oils and fats, polyol ester oil, phosphate ester oil, diester oil, polyglycol oil, silicone oil, polyphenylether oil, alkyldiphenylether oil, and fluorinated oil are given. These lubricating oils may be used alone or two or more thereof may be used in combination.

The grease may be any grease that is normally used for the rolling bearing without particular limitation. The base oil of the grease may be any of the above lubricating oils. The thickener of the grease may be, for example, metal soap thickener such as aluminum soap, lithium soap, sodium soap, composite lithium soap, composite calcium soap, or composite aluminum soap, an urea compound such as a diurea compound or a polyurea compound, or fluorine resin powder such as PTFE resin. Such thickener may be used alone or two or more kinds may be used in combination.

The lubricant may contain a known additive as necessary. Examples of the additive include a conductivity imparting agent such as carbon black, an extreme pressure agent such as an organic zinc compound or an organic molybdenum compound, an antioxidant such as an amine, phenol, or sulfur compound, an abrasion inhibitor such as a sulfur or phosphorus compound, a rust inhibitor such as polyhydric alcohol ester, a viscosity index improver such as polymethacrylate or polystyrene, a solid lubricant such as molybdenum disulfide or graphite, and an oily agent such as ester or alcohol.

The amount of lubricant to be enclosed is not particularly limited within the range that the desired lubricating characteristic can be secured, and is preferably approximately 50% to 80% (volume ratio) of the static space volume in the in-bearing space. In the present invention, the formation of the flocking part can reduce the resistance to agitation of the grease. Therefore, the rotational torque can be reduced while the amount of lubricant to be enclosed is set within the above range.

The embodiment of the present invention (deep groove ball bearing (with the sealing member)) has been described with reference to FIGS. 1 to 4. However, the rolling bearing according to the present invention is not limited thereto. For example, the present invention is applicable to any rolling bearing such as an angular ball bearing, a thrust ball bearing, a cylindrical roller bearing, a needle roller bearing, a thrust cylindrical roller bearing, a thrust needle roller bearing, a conical roller bearing, a thrust conical roller bearing, a self-aligning ball bearing, a self-aligning roller bearing, or a thrust self-aligning roller bearing. The present invention is applicable regardless of whether the sealing member (shield plate) is provided for the rolling bearing. Even if the bearing is the open type without having the sealing member, the present invention similarly provides the effect of retaining the lubricating oil and the like in the flocking part and the effect of scraping the lubricant on the surface of the rolling element to reduce the amount of lubricant on the rolling element.

Description is made of an embodiment of the rolling bearing with the conductivity. The rolling bearing according to this embodiment in the present invention has the structure with the flocking part as described above, and the inner ring and the outer ring, which are formed of the conductive material such as the bearing steel, are in electrical conduction through the conductive passage of at least (B) the conductive grease supplied as the lubricant and/or (A) the conductive flocking part formed using the conductive fiber. The specific conductive passage from the inner ring to the outer ring is not restricted in particular but it is necessary that, if the conductive passage is (A) and the conductive grease is not used, the conductive flocking part is in direct solid contact with the rolling element and the retainer. In this case, the rolling element and the retainer to serve as the conductive passage are formed of the conductive material.

The formation method, the material, the shape, and the like of the flocking part are as described above. In the case of forming the conductive flocking part, the conductive fiber is used as the short fiber. Examples of the conductive fiber include the carbon fiber, the synthetic resin fiber formed by dispersing uniformly the conductive filler typified by carbon black in the resin base material, or the synthetic resin fiber having its surface covered with the similar conductive material.

The adhesive used when the flocking part is formed is as described above. In the case of forming the conductive flocking part, the adhesive is preferably the conductive adhesive. Examples of the conductive adhesive include the adhesive containing conductive filler such as carbon, silver, or nickel.

The rolling bearing according to the present invention is lubricated with the lubricating oil or the grease. In the case of using the above (A) as the conductive passage, the lubricating oil is preferably used and the normal grease (non-conductive) can be used as the grease. However, the conductive grease is preferably used as the lubricant in any mode in order to avoid the conduction failure due to the oil film in the contact portion between the flocking part, and the rolling element and the retainer. In this case, the conductive grease is retained in the conductive flocking part; with the flocking part and the conductive grease retained therein, the stable conduction in the contact portion and the like becomes possible.

In the case of using the conductive grease, for example, the carbon-based thickener is used instead of the normal thickener. Examples of the carbon-based thickener include carbon black, graphite, fullerene, carbon nanotube, carbon nanofiber, and carbon fiber. Above all, the carbon black is preferable for its stable electric conduction. Carbon black may be furnace black, channel black, acetylene black, or Ketjen black. In the case of using the conductive grease, the normal thickener containing the conductivity imparting agent such as the carbon-based agent as the additive to be described below may be used.

Description is hereinafter made of the position in the conductive rolling bearing at which the flocking part is formed. In this embodiment, description is separately made of the cases in which conduction between the inner ring and the outer ring is performed through (A) the conductive flocking part and the retainer or the rolling element, and (B) the conductive grease.

Figure 8:
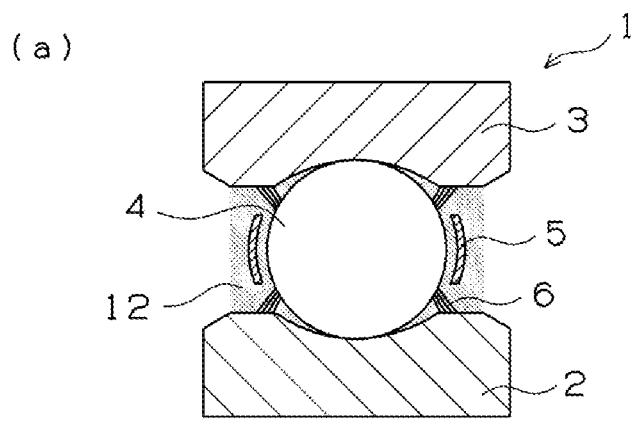
FIG. 8 are schematic sectional views illustrating a part of a mode in which the conductivity is secured.
Figure 8:
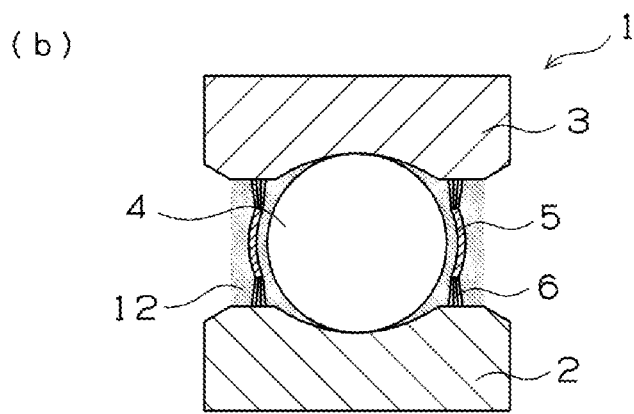

(A) Conduction Through the Conductive Part and the Retainer or the Rolling Element Description is made of the place where the flocking part is formed in this embodiment, with reference to FIG. 8. FIGS. 8(a) and (b) are sectional views schematically illustrating a part of the rolling bearing. The rolling bearing 1 of this embodiment includes the inner ring 2 and the outer ring 3 as the race ring, the plurality of rolling elements 4 held between the inner and outer rings, and the retainer 5 retaining the rolling elements 4. The rolling bearing 1 includes an annular sealing member (not shown) provided at an opening on opposite ends in the axial direction of the inner and outer rings, and is lubricated by the grease 12 enclosed in the in-bearing space formed by the inner ring 2, the outer ring 3, the retainer 5, and the sealing member. The grease 12 is not limited to the particular kind but is preferably the conductive grease in this embodiment. In this structure, the conductive flocking part 6 is formed at a predetermined position of the member shown in the drawing. The material and the formation method of the conductive flocking part 6 are as described above. In this embodiment, the flocking part is in solid contact with the retainer or the rolling element; therefore, the fiber used for the flocking part is preferably excellent in wear and abrasion resistance. For example, the short fiber formed by compositing the polyethylene resin and the conductive filler such as carbon black is preferably used.

In FIG. 8(a), the flocking part 6 is formed in the shoulder adjacent to the race ring surface (rolling surface) of the race ring (inner ring 2 and outer ring 3), and the fiber end of the flocking part 6 is in contact with the rolling element 4. In this case, the conduction between the inner ring 2 and the outer ring 3 is possible through the conductive passage of the inner ring 2—the flocking part (inner ring side) 6—the rolling element 4—the flocking part (outer ring side) 6—the outer ring 3. In FIG. 8(b), the retainer 5 serves as the conductive passage and the inner ring 2 and the outer ring 3 are in contact with the retainer 5 through the flocking part 6. In this case, the conduction between the inner ring 2 and the outer ring 3 is possible through the conductive passage of the inner ring 2—the flocking part (inner ring side) 6—the retainer 5—the flocking part (outer ring side) 6—the outer ring 3. The flocking part 6 may be formed on at least one of the retainer 5 side (inner and outer diameter surfaces of the retainer) and the race ring side (part of the race ring shoulder that faces the inner and outer diameter surfaces of the retainer). That is to say, the flocking part may be formed in the race ring shoulder with the end of the flocked fiber in contact with the inner and outer diameter surfaces of the retainer, or the flocking part may be formed on the inner and outer diameter surfaces of the retainer with the end of the flocked fiber in contact with the race ring shoulder.

The contact member serving as the conduction part is the flocking part 6 and the rolling element 4 in the case of FIG. 8 (a), and the relative speed difference of these members in the rotation of the bearing is approximately 50% of the relative speed difference between the inner ring 2 and the outer ring 3. In the case of FIG. 8 (b), the contact member serving as the conduction part is the flocking part 6 and the retainer 5, and the relative speed difference of these members in the rotation of the bearing is approximately 60% to 70% of the relative speed difference between the inner ring 2 and the outer ring 3. Therefore, as compared to the case in which the conduction part is provided at the end of the sealing member to enable the electric connection between the inner and outer rings, the abrasion of the flocking part (conduction part) can be suppressed and the conduction can be secured for a long period.

Figure 9:
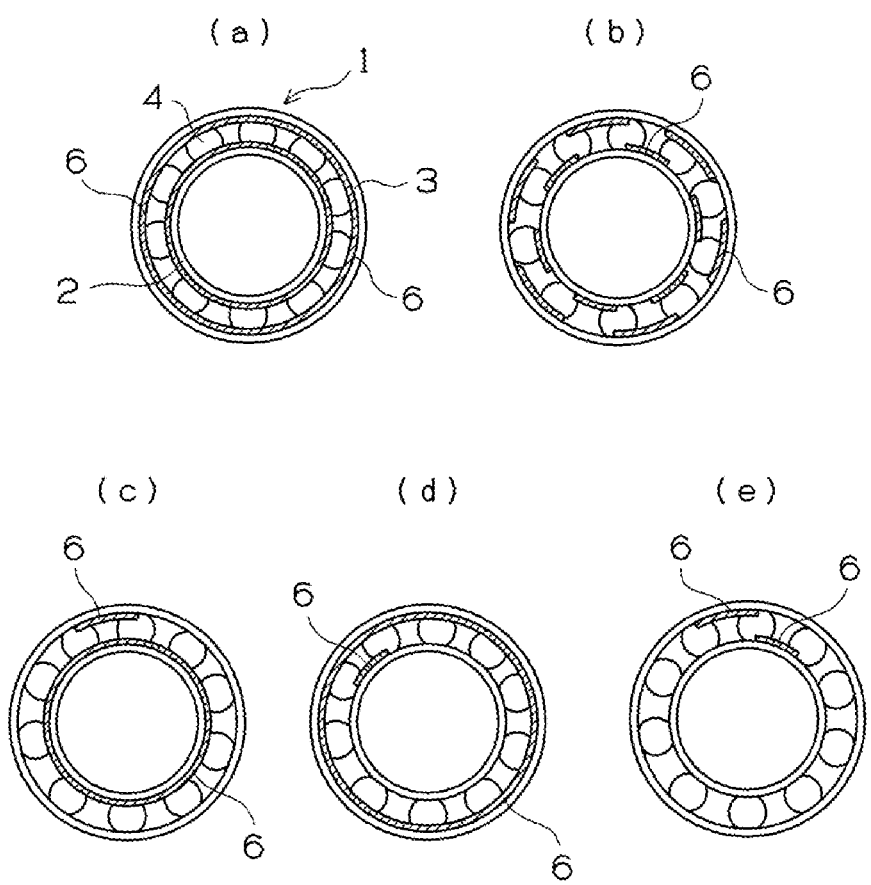
FIG. 9 are diagrams of the bearing illustrated in FIG. 10 viewed from a side.

FIG. 9 are schematic diagrams illustrating the rolling bearing of FIG. 8 viewed from a side surface. As illustrated in FIG. 9(a), the conduction can be stably secured by forming the conductive flocking part 6 along the entire periphery of the inner ring 2 and the outer ring 3. However, since the flocking part 6 is directly in contact with the retainer (not shown) and the rolling element 4, the flocking part 6 is preferably partly formed as illustrated in FIGS. 9(b) to (e) to have a smaller contact area under the circumstances where the small torque is required. In FIG. 9(b), the flocking part 6 is formed intermittently in a circumferential direction. In any case of the conduction through the rolling element 4 or the retainer, the continuous conduction is possible while the contact area with the flocking part 6 is reduced. FIGS. 9(c) and (d) illustrate the conduction method through the rolling element 4. In FIG. 9 (c), the flocking part 6 is formed in the range of one or more pitches of the bearing rolling element in the outer ring 3 along the entire periphery of the inner ring 2. In FIG. 9(d), the flocking part 6 is formed in the range of one or more pitches of the bearing rolling element in the inner ring 2 along the entire periphery of the outer ring 3. In FIGS. 9(c) and (d), the flocking part 6 is formed along the entire periphery of one of the inner ring 2 and the outer ring 3, enabling the continuous conduction in which the place where the flocking part is formed on the other corresponds to about one pitch of the bearing rolling element. In this case, the contact area with the flocking part 6 is largely reduced. FIG. 9(e) illustrates the conduction method through the retainer (not shown), and the flocking part 6 is formed by one or more pitches of the bearing rolling element on both the inner ring 2 and the outer ring 3. In this case, the continuous conduction is possible while the contact area with the flocking part 6 is largely reduced.

(B) Conduction Through the Conductive Grease

Figure 10:
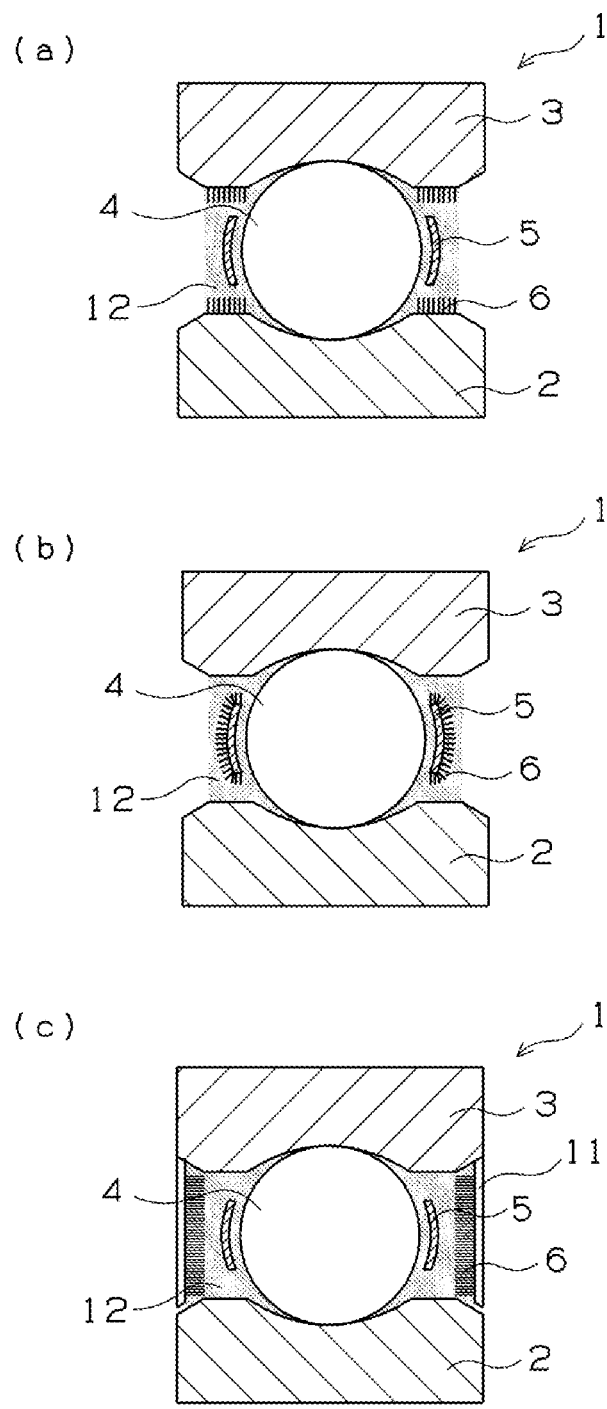
FIG. 10 are schematic sectional views illustrating a part of a mode in which the conductivity is secured.

Description is made of the place where the flocking part is formed in this embodiment, with reference to FIG. 10. FIGS. 10 (a) to (c) are schematic sectional views illustrating a part of the rolling bearing. The rolling bearing 1 according to this embodiment includes the inner ring 2 and the outer ring 3 as the race ring, the plurality of rolling elements 4 held between the inner and outer rings, and the retainer 5 retaining the rolling elements 4. The rolling bearing 1 includes the annular sealing member (reference numeral 11, illustrated in FIG. 10(*c*) only) provided for the opening at opposite ends in the axial direction of the inner and outer rings, and is lubricated by the grease 12 enclosed in the in-bearing space formed by the inner ring 2, the outer ring 3, the retainer 5, and the sealing member. In this embodiment, the grease 12 is the conductive grease for enabling the conduction. In this structure, the flocking part 6 is formed at the predetermined place of the member illustrated in the figure. The material and the formation method of the flocking part 6 are as described above.

In any case illustrated in FIGS. 10(*a*) to (*c*), the flocking part 6 retains the conductive grease 12. The flocking part 6 retains the grease 12, and having the grease 12 stay there fulfils the purpose of assisting to secure the conduction circuit. As compared to the case of (A) (the conduction is secured by having the flocking part in solid contact with the rolling element or the retainer), the deterioration such as the abrasion of the fiber in the flocking part is suppressed and the conduction can be secured for a long time. Moreover, the increase in torque due to the solid contact can be avoided.

In FIG. 10(*a*), the flocking part 6 is formed near the race ring surface of the race ring shoulder, and the conductive grease 12 retained in the flocking part 6 fills the space between the inner ring 2 and the outer ring 3, and the retainer 5, or between the inner ring 2 and the outer ring 3, and the rolling element 4, thereby enabling the conduction. In this case, one of the rolling element and the retainer is preferably formed of the conductive material. In FIG. 10(*b*), the flocking part 6 is formed on the side surface of the retainer 5, and the conductive grease 12 retained in the flocking part 6 connects between the inner ring 2 and the outer ring 3 along the outer peripheral surface of the retainer, thereby enabling the conduction. In this case, the retainer 5 itself does not need to have the conductivity. In FIG. 10(*c*), the flocking part 6 is formed on the surface of the sealing member 11 on the in-bearing space side (end face on the rolling element side), and the conductive grease 12 retained in the flocking part 6 connects between the inner ring 2 and the outer ring 3 along the flocking part forming surface of the sealing member 11, thereby enabling the conduction. In this case, the flocking part 6 is preferably the conductive flocking part.

The modes of the flocking part illustrated in FIGS. 10 (*a*) to (*c*) may be employed individually or in arbitrary combination. In addition, the modes illustrated in FIG. 8 and FIG. 9 may be employed in combination.

The rolling bearing according to the present invention has, in addition to the conduction, the excellent lubricating characteristic as described below. In the normal rolling bearings, grease reduces from near the race ring surface due to the centrifugal force by the rotation or agitation by the rolling of the rolling element. The grease may get adhered to the sealing member so that the grease does not contribute to the lubrication or may leak out of the bearing. On the other hand, the rolling bearing according to the present invention has the flocking part near the race ring surface or in the retainer. Thus, the fiber of the flocking part retains the grease, which is agitated or subjected to the centrifugal force, near the race ring surface and prevents the leakage of the grease, so that the lubricant can effectively contribute to the lubrication. In addition, since the grease rotates with the retainer, the resistance to agitation is not generated and the rotational torque can be reduced as compared to the case in which the flocking part does not exist. Furthermore, since the flocking part can retain the grease firmly, the grease can be retained near the race ring surface even if the amount of grease to be enclosed is reduced. Furthermore, the rotational torque can be reduced. It is possible to prevent the grease from leaking out of the bearing also when the flocking part is formed on the end face of the sealing member on the rolling element side.

The grease is softened if sheared, and the softened grease is easily separated to shorten the lubricating life. In the present invention, however, the grease is retained in the flocking part so that the grease is uneasily sheared. This can increase the life of the lubrication. In the case of the oil lubrication, having the flocking part retain the lubricating oil enables the sufficient amount of lubricating oil to be retained in the bearing without the necessity of supplying oil from the outside, and in this case, the semi-solid substance which would interrupt the rotation, like the grease lubricating, does not exist. This decreases the torque further.

The embodiments of the rolling bearing with the conductivity have been described with reference to FIGS. 8 to 10; however, the bearing is not limited thereto. For example, the present invention is applicable to any type of rolling bearing such as a deep groove ball bearing, an angular ball bearing, a thrust ball bearing, a cylindrical roller bearing, a needle roller bearing, a thrust cylindrical roller bearing, a thrust needle roller bearing, a conical roller bearing, a thrust conical roller bearing, a self-aligning ball bearing, a self-aligning roller bearing, or a thrust self-aligning roller bearing. The present invention is applicable regardless of whether the sealing member (shield plate) is provided for the rolling bearing.

EXAMPLES

Example 1

A resin crown retainer with the shape illustrated in FIG. 2, which can be used for the 6206 rolling bearing (deep groove ball bearing), was manufactured through injection molding. The resin material is nylon 66 (containing 30 vol % of glass fiber). An adhesive was applied to the inner and outer diameter surfaces of the retainer (areas illustrated in FIG. 2) and the flocking part including polyamide resin fiber was formed through the electrostatic flocking. This flocking retainer was incorporated in the 6206 rolling bearing (deep groove ball bearing), and the grease (lithium soap+ester oil) was enclosed in the in-bearing space by 70 vol % in static space volume ratio. Then, the space was sealed with the shield plate and the sample bearing was thus obtained. The obtained sample bearing was subjected to the torque measurement test 1 below, so that the change in rotational torque over time was examined.

<Torque Measurement Test 1>

The sample bearing was fixed in a vertical chamber under the condition that the atmosphere was the room temperature (25° C.) and the number of rotation was set to 1800 rpm, and was bound with a load cell while an axial load of 24 N was applied to the outer ring. The inner ring was rotated and the rotational torque occurring in the bearing was calculated.

Comparative Examples 1 to 3

A resin crown retainer, which can be used for the 6206 rolling bearing (deep groove ball bearing), was manufactured through injection molding. The resin material is nylon 66 (containing 30 vol % of glass fiber). This retainer has the same shape as the retainer according to Example 1 except that the flocking part is not formed on the inner and outer diameter surfaces. This flocking retainer was incorporated in the 6206 rolling bearing (deep groove ball bearing), and the grease (lithium soap+ester oil) was enclosed in the in-bearing space by 30 vol % (Comparative Example 3), by 50 vol % (Comparative Example 2), and by 70 vol % (Comparative Example 1), in static space volume ratio. Then, the space was sealed with the shield plate and the sample bearing was thus obtained. The obtained sample bearing was subjected to the torque measurement test 1 which is the same test as in Example 1, so that the change in rotational torque over time was examined.

Figure 5:
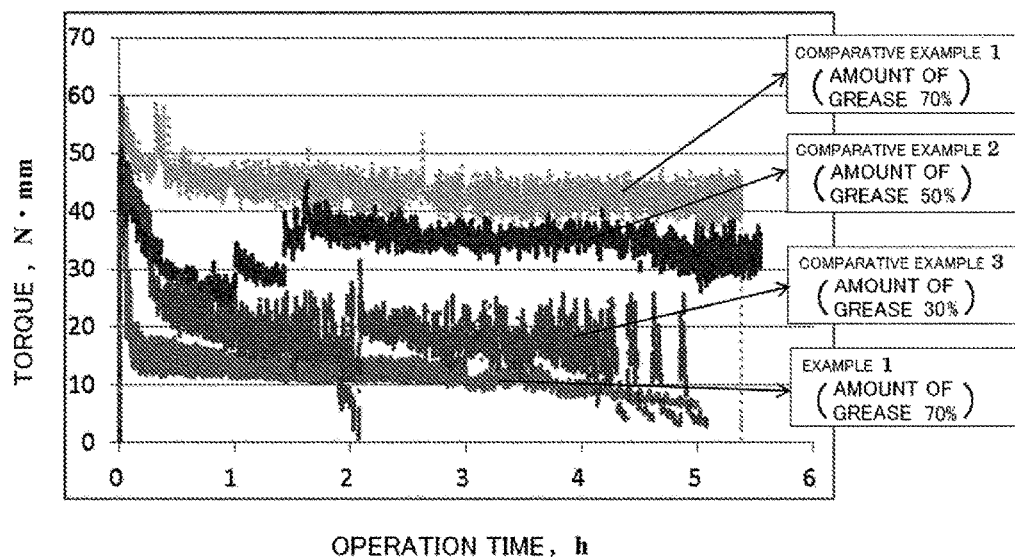
FIG. 5 is a diagram representing the change in rotational torque over time.

FIG. 5 shows the results of the torque measurement test 1 in Examples and Comparative Examples. In FIG. 5, the horizontal axis represents the operation time (hour (h)), and the vertical axis represents the rotational torque (N·mm).

As illustrated in FIG. 5, if containing the same amount of grease to be enclosed, the flocking retainer can reduce the rotational torque drastically. To achieve the equivalent torque without the flocking retainer, the amount of grease to be enclosed needs to be reduced to approximately 30 vol % (Comparative Example 3) but in this case, the lifetime of the grease of the bearing is shortened.

In Example 1, the movement of the grease itself is suppressed; therefore, the leakage of the grease is reduced. In addition, the grease in Example 1 is not sheared as compared to the grease in Comparative Example 1. Thus, it is expected that the grease in Example 1 is uneasily separated and the lubricating life is long.

Example 2

A resin crown retainer with the shape illustrated in FIG. 2 was manufactured through injection molding. The resin material is nylon 66 (containing 30 vol % of glass fiber). An adhesive was applied to the entire surface of the retainer (except the pocket part) and the flocking part including polyamide resin fiber was formed through the electrostatic flocking. This flocking retainer was incorporated in the rolling bearing (bearing size: 20 mm in inner diameter, 47 mm in outer diameter, and 14 mm in width), and the urea grease was enclosed in the in-bearing space by 95 vol % in static space volume ratio (35 vol % in the entire space ratio). The sample bearing was thus obtained. The obtained sample bearing was subjected to the torque measurement test 2 and the high-temperature durability test below.

<Torque Measurement Test 2>

The sample bearing was fixed in a vertical chamber under the condition that the atmosphere was the room temperature (25° C.) and the number of rotation was set to 3600 rpm, and was bound with a load cell while an axial load of 19.6 N was applied to the outer ring. The inner ring was rotated and the rotational torque (N·mm) occurring in the bearing was calculated.

<High-Temperature Durability Test>

The bearing was operated at a rotation speed of 10000 rpm under the condition that the temperature of the outer diameter part of the outer ring thereof was set to 150° C., the radial load was set to 67 N, and the axial load was set to 67 N, and the time taken to burn out the bearing (high-temperature high-speed lifetime, h (hours)) was measured.

Comparative Examples 4 to 6

A resin crown retainer with the shape illustrated in FIG. 2 was manufactured through injection molding. The resin material is nylon 66 (containing 30 vol % of glass fiber). This retainer has the same shape as the retainer according to Example 2 except that the flocking part is not formed. This standard retainer was incorporated in the rolling bearing (bearing size: 20 mm in inner diameter, 47 mm in outer diameter, and 14 mm in width), and the urea grease was enclosed in the in-bearing space by 90 vol % in static space volume ratio (35 vol % in the entire space ratio) (Comparative Example 4), by 65 vol % in static space volume ratio (25 vol % in the entire space ratio) (Comparative Example 5), and by 45 vol % in static space volume ratio (17 vol % in the entire space ratio) (Comparative Example 6). The sample bearing was thus obtained. The obtained sample bearing was subjected to the torque measurement test 2 and the high-temperature durability test below, which are the same test as in Example 2.

Figure 6:
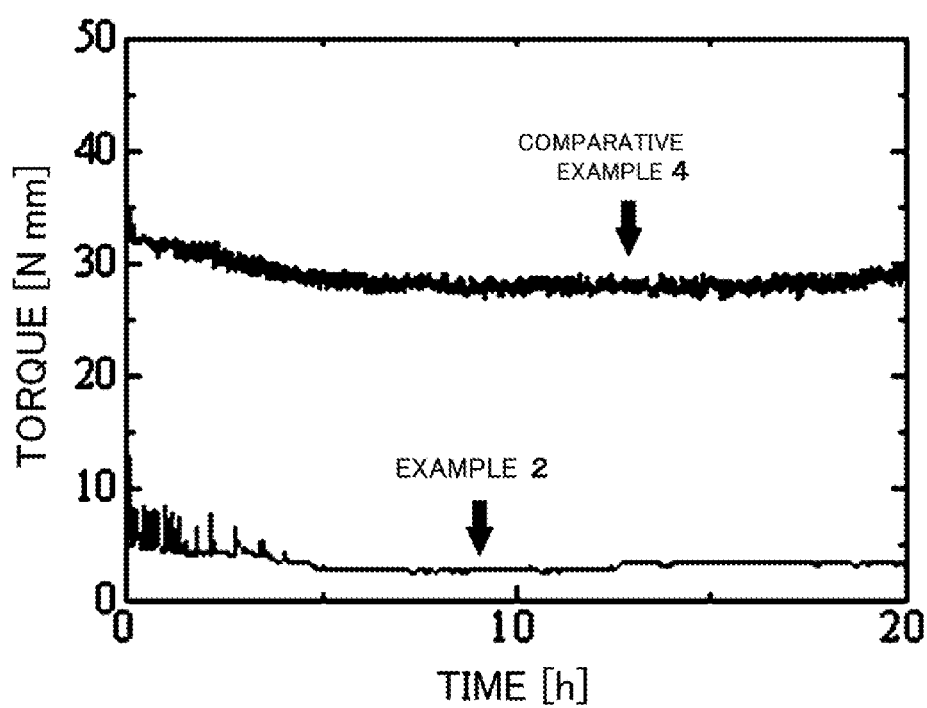
FIG. 6 is a diagram representing the change in rotational torque over time.
Figure 7:
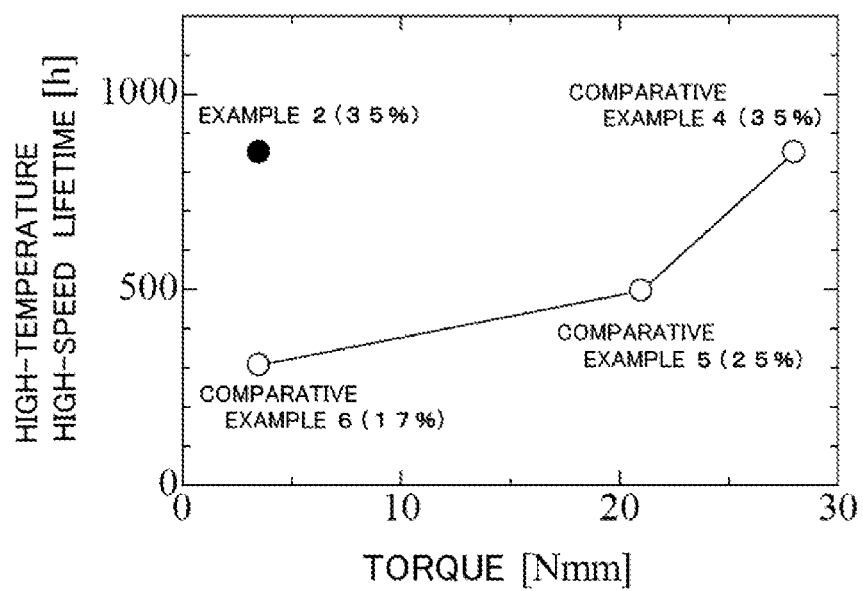
FIG. 7 is a diagram representing the relation between the rotational torque and the high-temperature high-speed lifetime.

FIG. 6 shows the results of the torque measurement test in Example 2 and Comparative Example 4. In FIG. 6, the horizontal axis represents the operation time (hour (h)), and the vertical axis represents the rotational torque (N·mm). FIG. 7 shows the relation between the rotational torque and the high-temperature high-speed lifetime. In FIG. 7, the horizontal axis represents the rotational torque (N·mm), and the vertical axis represents the high-temperature high-speed lifetime (h (hours)). The numerals in the parenthesis in Examples and Comparative Examples represent the amount of grease to be enclosed. The rotational torque in FIG. 7 corresponds to the torque 10 hours after the start of the test.

As shown in FIG. 6, the operation is possible at $1/10$ of the rotation torque in Example 2 as compared to Comparative Example 4 though the amount of grease to be enclosed is the same. Thus, it is understood that Example 2 is effective in reducing the torque and the torque spike. As shown in FIG. 7, moreover, the high-temperature high-speed lifetime can be extended as the amount of grease to be enclosed is increased in Comparative Examples 4 to 6 where the normal retainer is used, but the rotational torque is also increased. On the other hand, in Example 2 where the flocking retainer is used, the torque is small even if the amount of grease to be enclosed is large, so that the long life and the small torque can be achieved.

INDUSTRIAL APPLICABILITY

The rolling bearing according to the present invention employs the existing bearing shape and lubricant but can easily achieve the higher lubricating characteristic including the smaller rotational torque and thus can be widely used as the rolling bearing in the various applications.

EXPLANATION OF REFERENCE NUMERALS AND SYMBOLS 1 rolling bearing
2 inner ring
3 outer ring
4 rolling element
5 retainer
6 flocking part
7 retainer main body
8 retaining nail
9 pocket part
10 flat part
11 sealing member
12 grease

The invention claimed is:

1. A rolling bearing comprising:
an inner ring and an outer ring as a race ring;
a plurality of rolling elements held between the inner and outer rings;
a retainer that retains the rolling elements; and
a lubricant including grease or lubricating oil supplied to an in-bearing space, wherein
at least one member selected from the inner ring, the outer ring, and the retainer is provided with a flocking part formed by flocking fiber on a surface of the member which is in contact with the lubricant except for a surface in contact with the said rolling elements wherein said flocking part has a fiber end in contact with said rolling elements.

* * * * *